Aug. 20, 1940.    W. H. RILEY    2,211,989
VARIABLE CAMBER AND VARIABLE THICKNESS AIRFOIL
Filed July 2, 1938    6 Sheets-Sheet 4
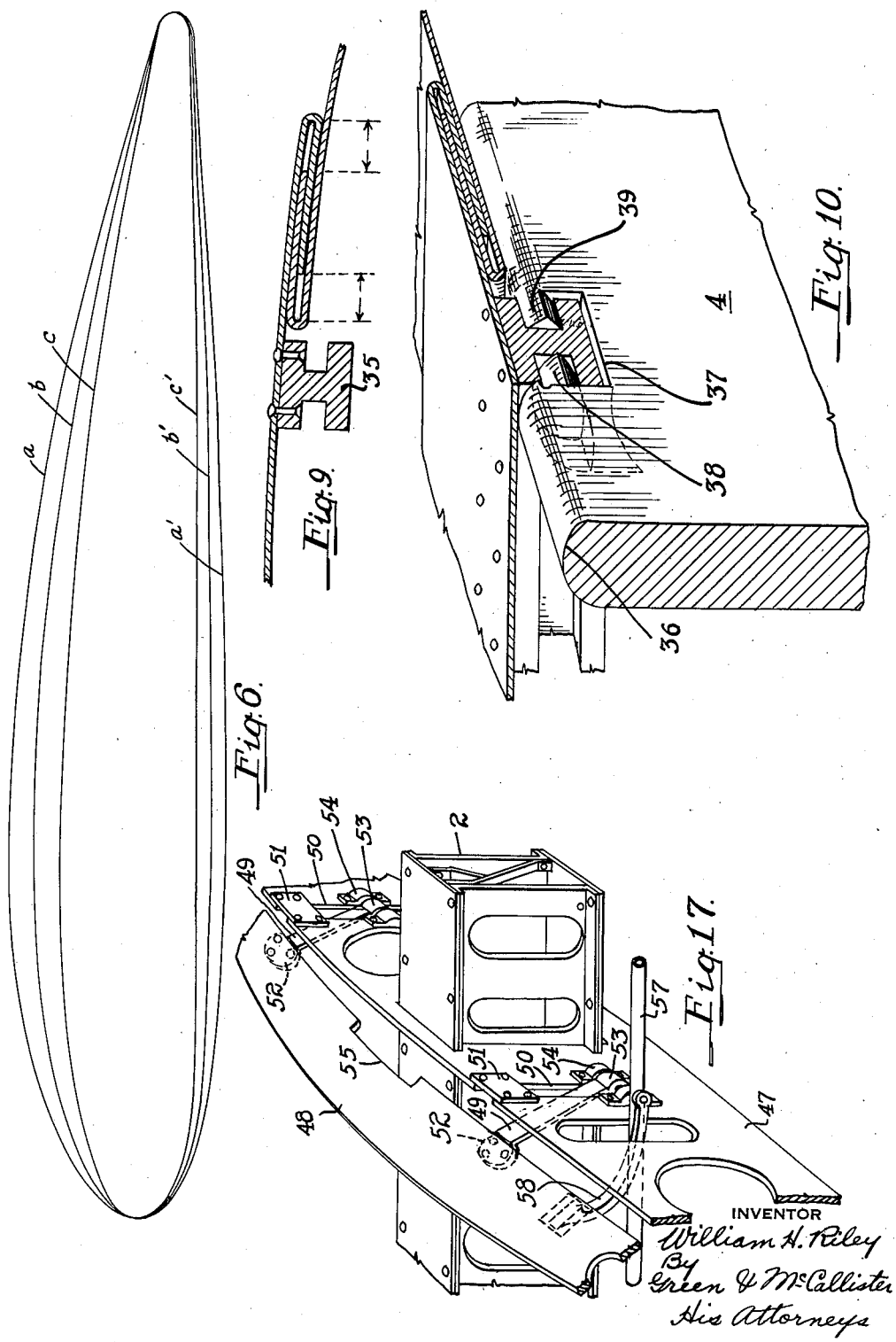

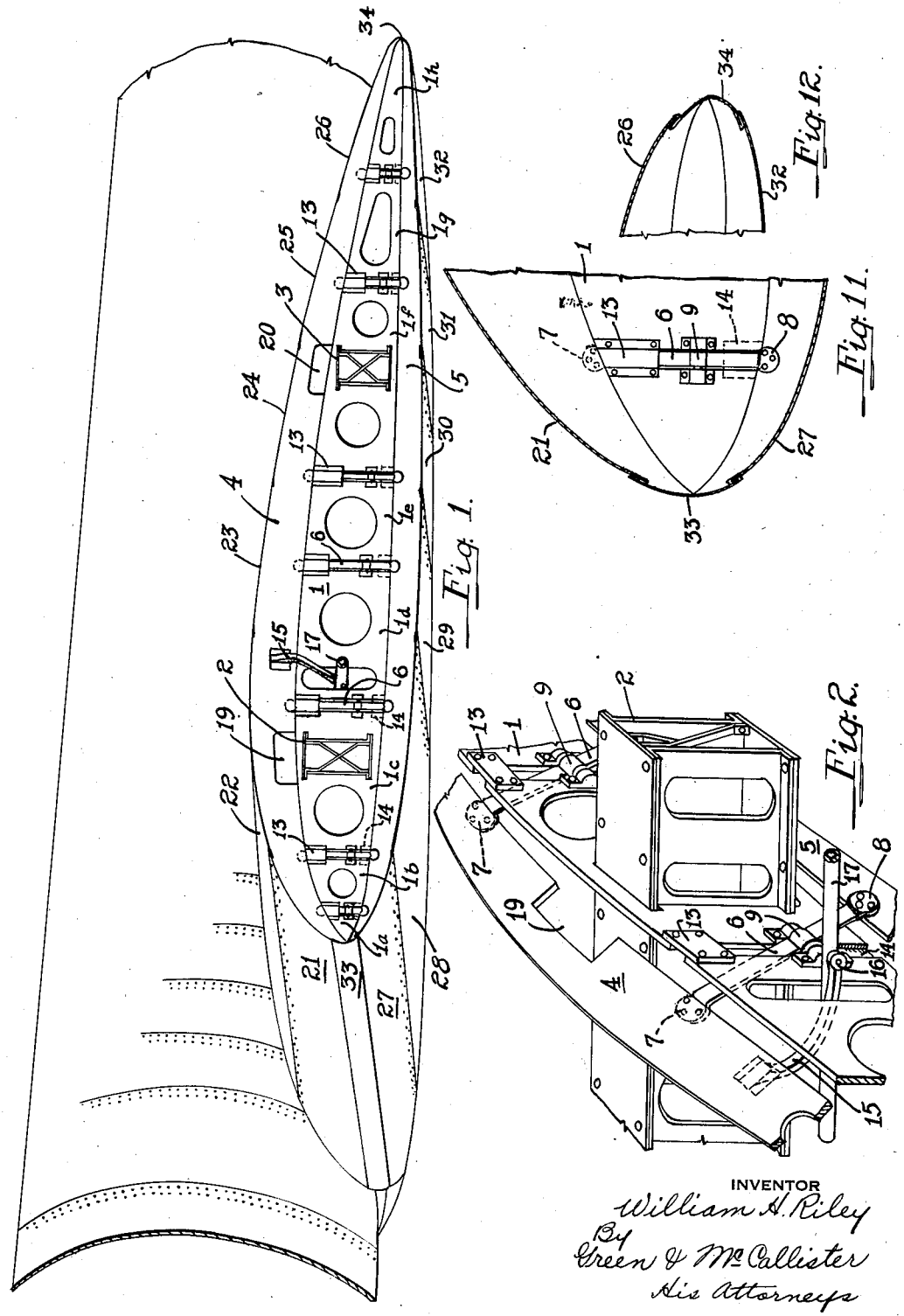

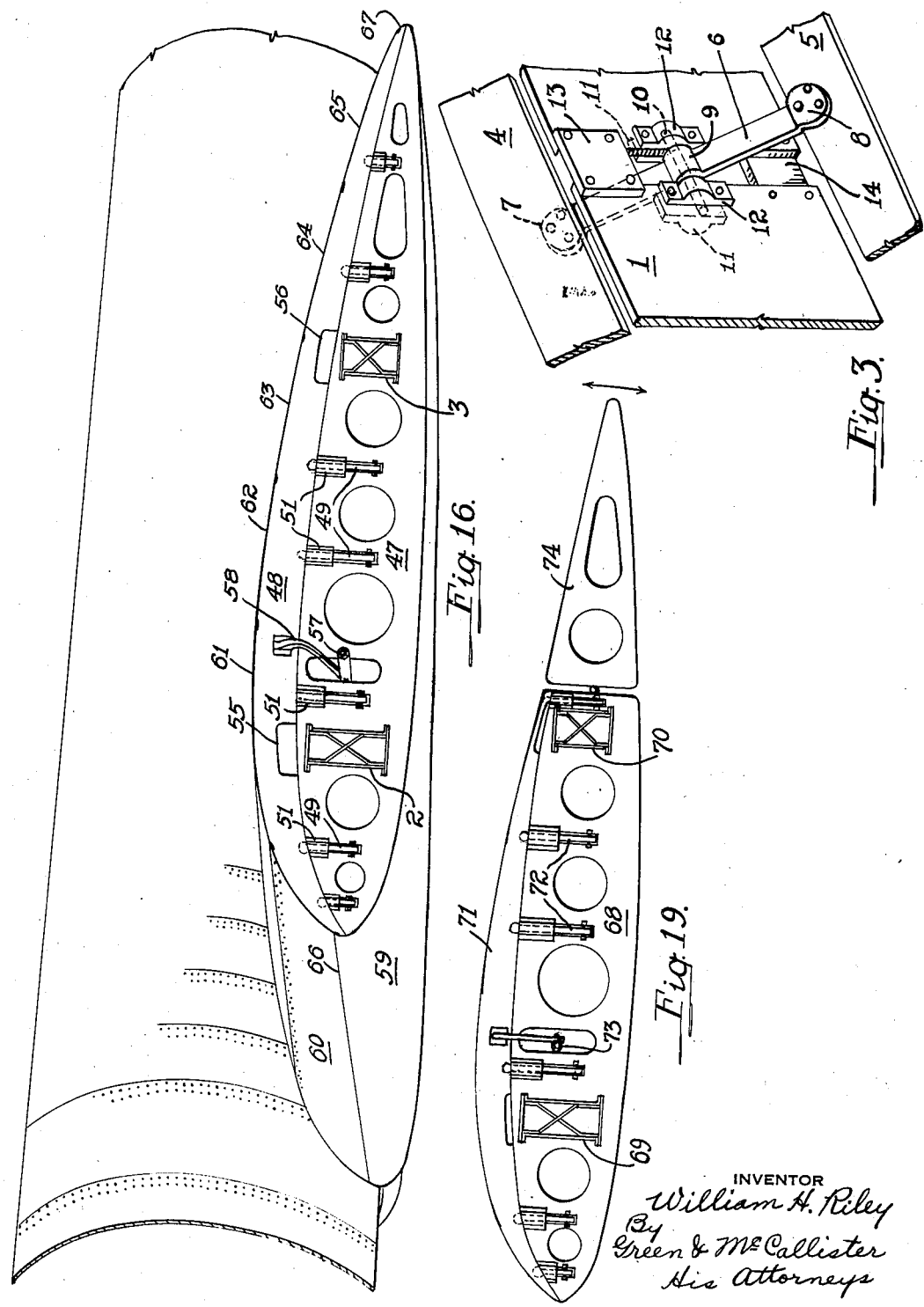

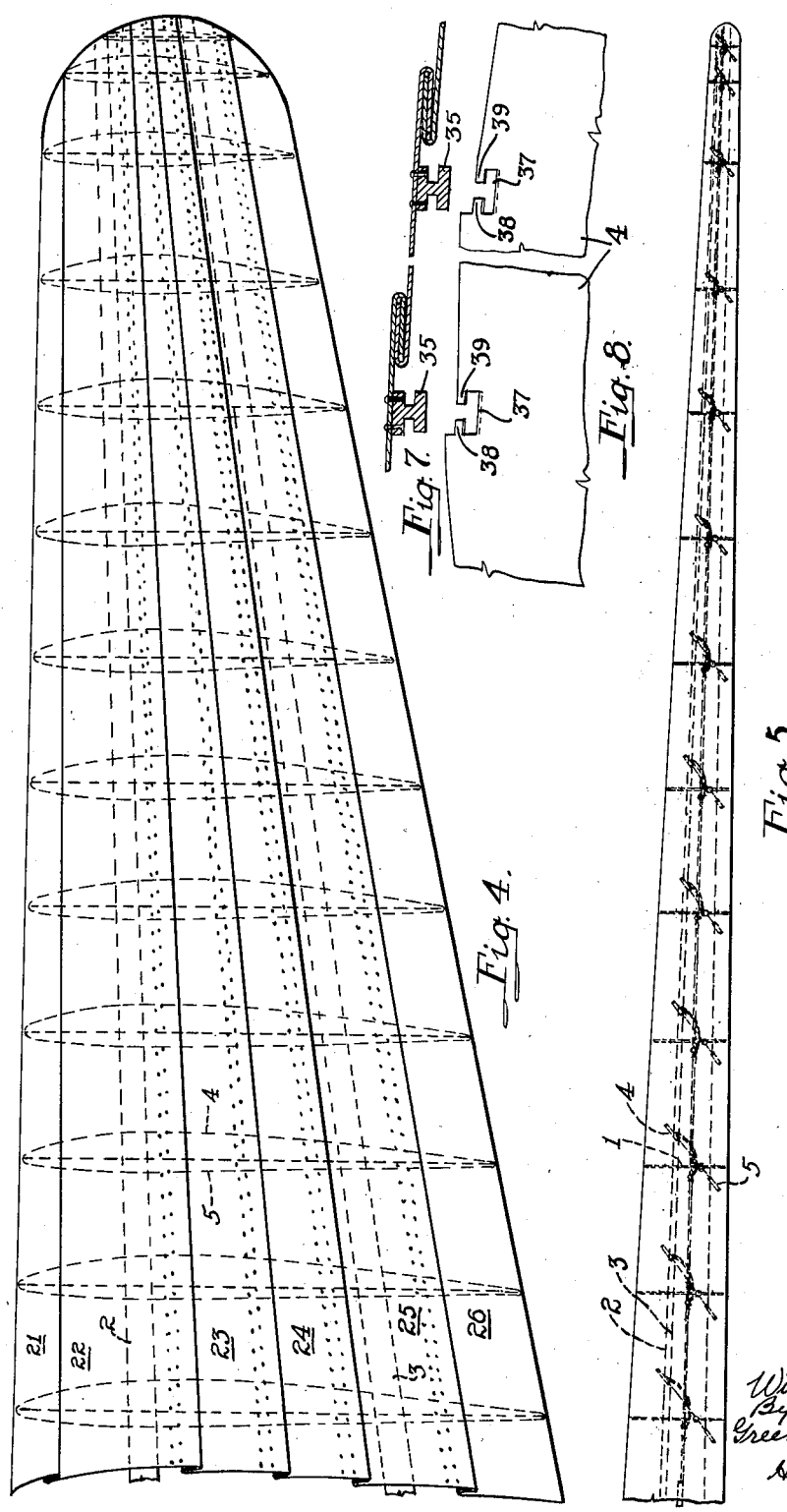

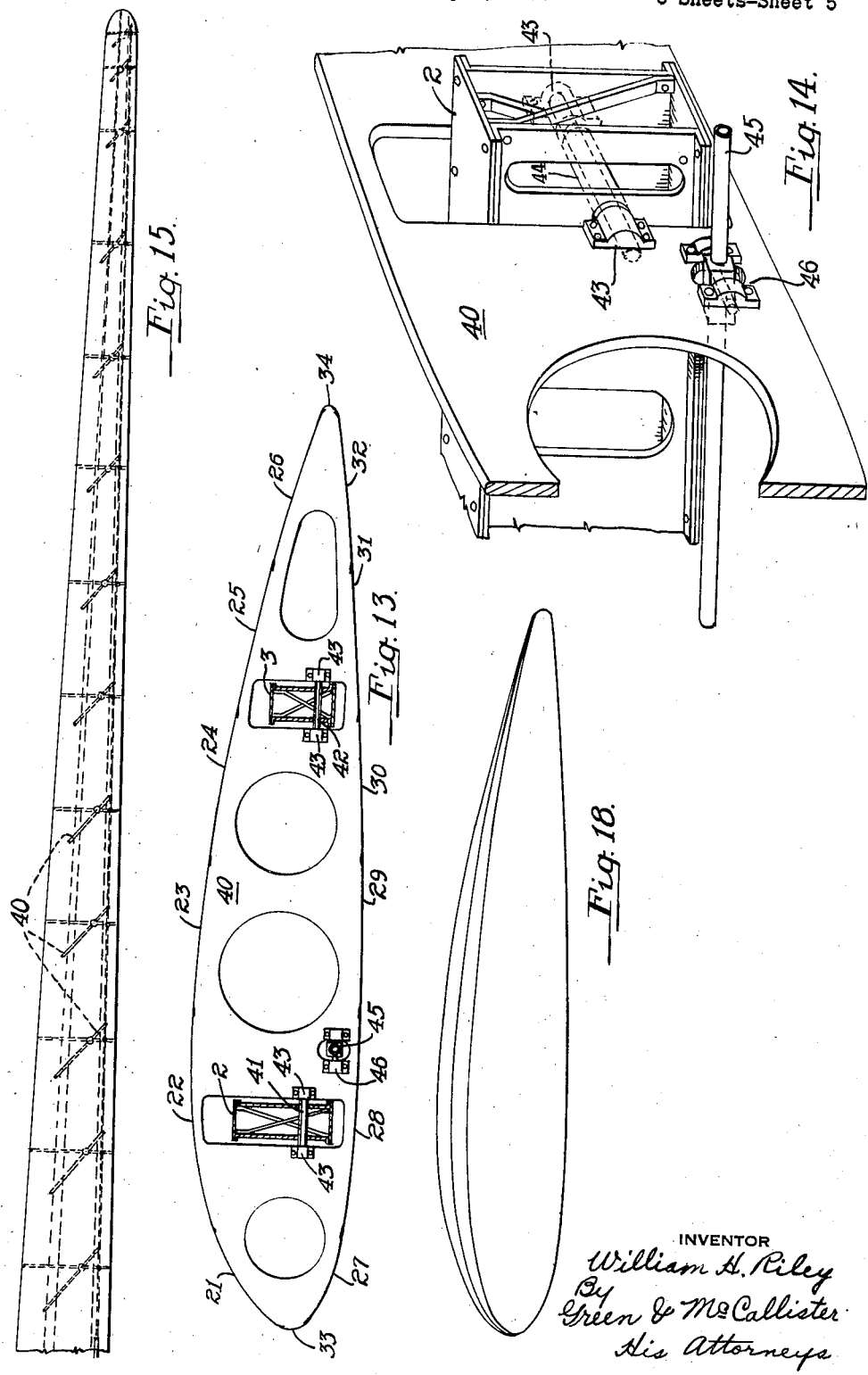

Aug. 20, 1940.  W. H. RILEY  2,211,989
VARIABLE CAMBER AND VARIABLE THICKNESS AIRFOIL
Filed July 2, 1938  6 Sheets-Sheet 6
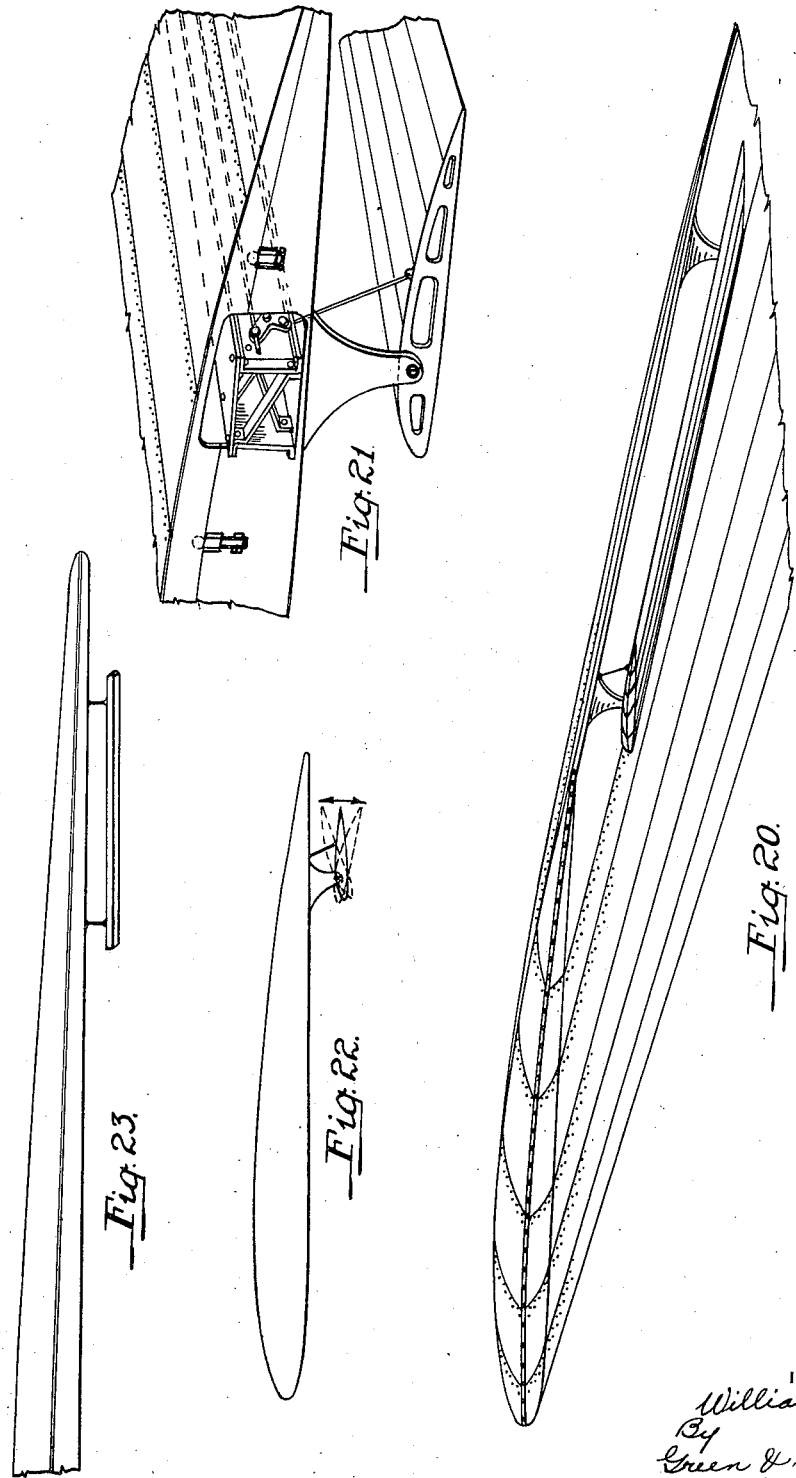
INVENTOR
William H. Riley
By
Green & McCallister
His Attorneys Patented Aug. 20, 1940

2,211,989

UNITED STATES PATENT OFFICE 2,211,989

VARIABLE CAMBER AND VARIABLE THICKNESS AIRFOIL

William H. Riley, Millvale, Pa.

Application July 2, 1938, Serial No. 217,205

17 Claims. (Cl. 244—44)

This invention relates to airfoils and more particularly to variable camber, variable thickness airfoils for aircraft.

I am aware that the idea of varying the camber and the thickness of airfoils for aircraft is not new. While a number of patents disclosing various schemes looking to these ends have been granted, it is my belief that none of these discloses anything of practical value, and an object of this invention is to produce a practical variable camber and variable thickness airfoil for aircraft.

A further object is to produce a simple, practical aircraft airfoil structure in which both the upper and lower cambers and the airfoil thickness can be varied during flight with the airfoil remaining in the same family during all variations of the cambers and airfoil thickness.

Another object is to produce a simple and improved airfoil in which the upper camber at least and the airfoil thickness can be readily and quickly varied during flight.

A still further object is to produce an aircraft airfoil structure in which the lengths of its section ordinates can be proportionally increased or decreased during flight without shifting the center of gravity of the aircraft.

These, as well as other objects which will be apparent to those skilled in this particular art, I attain by means of the structures described in the specification and illustrated in the drawings accompanying and forming part of this application.

In the drawings:

Figure 1 is a fragmentary view in perspective of part of the fuselage of an aircraft and part of a wing airfoil embodying the first form of this invention. In this form, both the upper and lower cambers are simultaneously variable.

Fig. 2 is an enlarged fragmentary detail view illustrating a portion of one of the three part ribs utilized in the first form of this invention and shown in Fig. 1;

Fig. 3 is an enlarged detail view of a portion of the structure shown in Fig. 2;

Fig. 4 is a top plan view of an aircraft wing embodying the form shown in Fig. 1;

Fig. 5 is a front view of a wing of Figs. 1, 2 and 3;

Fig. 6 is a profile view of the airfoil embodying the form shown in Figs. 1 to 5 and 13 to 15 inclusive, (the first and second forms) lines $a$—$a'$ illustrating the maximum setting of the cambers; lines $b$—$b'$ an intermediate setting of the cambers and lines $c$—$c'$ the minimum setting of the cambers;

Fig. 7 is a fragmentary view in transverse section illustrating the skin and preferred construction of the sliding joints as utilized between adjacent sections of the upper and lower skins; each skin section being equipped with an H beam by means of which such section is secured to the ribs;

Fig. 8 is a view in side elevation of a portion of a rib section provided with slots to receive the H beam;

Fig. 9 is an enlarged fragmentary view in section of a sliding joint and H beam;

Fig. 10 is an enlarged fragmentary view in perspective of part of a rib section and two adjacent skin sections and illustrates the connection between one such skin section and a rib section;

Fig. 11 is an enlarged fragmentary sectional view of the leading edge of the airfoil of the first form;

Fig. 12 is an enlarged fragmentary view in section of the trailing edge of the airfoil of the first form;

Fig. 13 is a transverse sectional view of a wing airfoil embodying this invention in what I term the second form. In the structure of this form, each entire rib is mounted for tilting so that the upper and lower cambers are simultaneously varied as in the first form;

Fig. 14 is an enlarged fragmentary view in perspective of a portion of the airfoil wing and skin structures of Fig. 13 (second form);

Fig. 15 is a front view of an aircraft wing as illustrated in Figs. 13 and 14;

Fig. 16 is a fragmentary view in perspective of part of the fusilage of an aircraft and part of a wing airfoil embodying one form of this invention. In this form the upper camber only is variable and this form I term the third form.

Fig. 17 is an enlarged fragmentary detail view illustrating a portion of one of the two-part ribs utilized in the form shown in Fig. 16 (third form);

Fig. 18 is a profile view of the airfoil of the third form of this invention; in this form the upper camber only is variable. This view represents the profile of maximum camber, minimum camber and intermediate camber as will be apparent.

Fig. 19 is a transverse section of a stabilizer embodying this invention (third form) and in this view an elevator attached to the stabilizer is also shown in transverse section;

Fig. 20 is a view in perspective of an aircraft wing embodying this invention and illustrates a type of aileron suitable for use in connection with a wing embodying this invention in all three forms;

Fig. 21 is a more or less schematic view and illustrates part of an aircraft wing embodying this invention (third form) and shows one method of attaching and manipulating the external aileron of Fig. 20;

Figs. 22 and 23 are more or less schematic views of such wing and aileron, Fig. 22 being a view in transverse section of the wing and aileron and Fig. 23 being a front view of the wing and aileron.

The wing panel of an airfoil embodying this invention in its different forms is preferably of conventional pattern and design so far as outside appearance is concerned. The wing profile may be one of any of the well known classes or families, viz., a Clark Y, a Gottingen 398 or any other that has proved efficient. For the purposes of this application, I have chosen the Clark Y without, however, any idea of limiting my invention to any particular class or family.

I prefer to use large superstrength spars formed from tubing or fabricated from plate or sheet-like light metal such as Duralumin and their location may be the same as in any standard wing design.

The skin which forms the cambers is preferably constructed of metal and is made up in sections which extend from the leading to the trailing edge of the airfoil. The sections are arranged in overlapping relation, the overlap being sufficient to permit slight telescopic movement between the sections chordwise or transversely of the airfoil.

The ribs are carried by the spars and are spaced at relatively short intervals throughout the length of the airfoil. The ribs extend from the leading to the trailing edge of the airfoil and are attached to and carry the skin sections.

In this application, I disclose three airfoil structures embodying this invention and these differ from one another in rib structure details.

In what I term the first form, each of the ribs has a central portion or section extending throughout the width of the airfoil and which is rigidly attached to the spars. Each rib has top and bottom portions or sections hinged to the central section and which extend throughout the width of the airfoil. The hinge point for the hinged sections is located on the chord line of the fixed section and the hinged sections are so interconnected that they are tiltable simultaneously in opposite directions about said chord line.

The longitudinally extending skin sections forming the upper camber are attached to the upper hinged rib sections or members and the longitudinally extending skin sections forming the lower camber are attached to the lower hinged rib sections or members. The attachment is such that as said rib sections or members are tilted the sliding joints between the skin sections will permit relative movement to take place between the skin sections. As the rib sections are tilted from vertical position (maximum camber position) the skin will contract or telescope; that is, the overlap of the sections will increase. The amount of contraction of the skin will depend upon the degree of tilt given to the tiltable rib sections. When the rib sections are moved toward vertical position, the skin will expand; that is, the amount of overlap of the skin sections will decrease.

When the upper and lower rib sections are in vertical position or in the planes of the fixed rib sections, the upper and lower skins will be in maximum camber position. When the hinged sections of the ribs are given their full tilt, the upper and lower skins will be in minimum camber position. The tilting rib sections are capable of such manipulation that they may be readily moved during flight to maximum camber position, minimum camber position or to any position between maximum and minimum camber positions and may be locked in any position to which they are adjusted.

In what I term the second form of this invention, each rib is pivotally mounted on both spars in such manner that each rib as an entirety is tiltable about its chord line. The ribs are interconnected so that they can be simultaneously tilted to vary the cambers and the airfoil thickness as in the first form.

The longitudinally extending skin sections forming both the upper and lower cambers are so attached to the ribs that as the ribs are tilted relative movement will take place between the skin sections as in the first form. When the ribs are in vertical position, the skin sections will be in maximum camber position and when the ribs are given their maximum tilt, the skin sections will be in minimum camber position. The ribs are capable of such manipulation that they can be readily moved during flight to maximum camber position, minimum camber position or to any position between maximum and minimum camber positions and may be locked in any position to which they are so adjusted.

In what I term the third form, each of the ribs is formed in two sections, a rigid lower section or member which is attached to and carried by the spars and a hinged upper section or member which is hinged to the fixed section and arranged for tilting about the chord line of this fixed section.

In this form, the lower skin is what may be termed fixed, that is, it is a skin as is commonly used and is not telescopic as in the first and second forms. The upper skin is formed in the same manner as the upper skin of both the first and second forms and certain of its longitudinally extending sections are attached to the hinged rib sections. In this third form, the upper camber only is variable, and camber and airfoil thickness variations are obtained by varying the upper camber.

The hinged rib sections are interconnected so that they can be simultaneously tilted as desired during flight to vary the upper camber and the airfoil thickness.

*First form*

In this form, which employs ribs, with central fixed sections or members and upper and lower hinged sections or members to which the skin is attached, fixed sections 1 are rigidly secured to and carried by spars 2 and 3 and as shown in Figure 1, these sections extend from the leading to the trailing edge chordwise of the airfoil.

The upper section 4 as well as the lower section 5 of each rib is hinged to the central section 1 in such manner that said sections can be tilted about axes, which extend chordwise or transversely of the airfoil.

In order to accomplish this, each section 4 is connected to section 5 lying therebeneath by a series of support arms 6. The ends of these arms are oppositely offset as best shown in Fig. 3 and as shown at 7 and 8 the offset ends are riveted or otherwise secured to sections 4 and 5. Each support arm 6 at the chord line of the section ordinate at which such rib is located is provided with a cylindrical enlargement 9 having a through bore provided therein for the reception of a hinge pin 10, shown best in Fig. 3. Each central rib section 1 at such chord line carries bearing block members 11—11, 12—12 within which hinge pins 10 are journaled. The axes of these pins coincide with the chord line and therefore lie midway between the opposite side face of central rib section 1.

Each of the fixed rib sections 1 (see Figs. 2 and 3) is preferably made up of a series of spaced sections (1a, 1b, 1c, 1d, 1e, 1f, 1g, and 1h) rigidly connected together by means of upper bridging members 13 and lower bridging members 14. Bridging members 13 are located on the opposite side of the fixed rib from bridging members 14 and the distance between the adjacent ends of the sections 1a, 1b, etc. of the central rib sections is such as to permit support arms 6 to lie between the ends of such sections when the support arms 6 are in vertical position.

In other words, when the support arms are in vertical position, the hinged rib sections 4 and 5 lie flush with the central fixed rib section 1 due to the offset ends of the support arms.

Each upper hinged section 4 has riveted or otherwise rigidly secured thereto a camber control arm 15 the free end of which is pivotally connected as at 16 to a camber control shaft or member 17. This control shaft or member 17, which is preferably tubular, is mounted for reciprocation longitudinally of the airfoil; suitable bearings being provided to carry the same.

The camber control shaft or member 17 is under the control of the pilot and may be actuated in any suitable manner as by a hydraulic motor, an electric motor or other suitable device, as desired.

From the above, it will be seen that when the camber control member 17 is moved in one direction (toward the right of Figure 2) all of the upper hinged rib sections 4 will be tilted downwardly or toward the left of Figure 2 and simultaneously therewith all of the lower hinged rib sections 5 will be tilted upwardly in the opposite direction or toward the right of Fig. 2. Obviously when camber control member 17 is moved in the opposite direction, hinged sections 4 and 5 will be simultaneously tilted toward vertical position.

The upper rib sections are cut away as shown at 19 and 20 in order to clear the tops of spars 2 and 3 to allow the upper hinged sections 4 to be given their maximum tilt, that is, to be moved to minimum camber position.

The fixed rib sections 1 may be secured to the spars in any suitable manner as will be readily understood.

The number of longitudinally extending sections forming the upper and lower skins of the airfoil will depend somewhat on the size of the airfoil and the service to which the aircraft is to be subjected.

In Figure 1, the upper as well as the lower skin is made up of six longitudinally extending sections. For the upper skin, these sections are numbered 21, 22, 23, 24, 25 and 26 and for the lower skin 27, 28, 29, 30, 31 and 32. Section 21 of the upper skin and 27 of the lower skin, that is the forward sections or those nearest the leading edge of the airfoil are connected at the leading edge by a leading edge section 33 and section 26 of the upper skin and 32 of the lower skin are connected by a trailing edge section 34. Sections 33 and 34 are what I term fixed position or stationary sections, while the other sections are what I term movable sections.

The longitudinally extending skin sections are connected together in such manner as to permit relative movement between the adjacent sections chordwise or transversely of the airfoil. The preferred type of interlocking and telescoping joint is illustrated in Figs. 7, 9 and 10. Fig. 7 shows the telescoping joints fully extended as they will appear at maximum camber position of the skin sections and Figs. 9 and 10 each show a joint telescoped or as the same will appear when the skins are in minimum camber position.

These joints are formed by bending back upon the main body of each longitudinally extending member an edge portion of appreciable width. This section parallels the main body section and stands away from the same a distance but slightly greater than the skin thickness as shown in Figs. 7, 9 and 10.

The bent back portion at the forward edge of each movable longitudinally extending skin section lies above the body portion of such section while the rear bent back edge portion lies below the body portion, so that as the longitudinally extending skin sections progress chordwise from the leading to the trailing edge of the airfoil, the forward section overlaps the next section to the rear and such section overlaps the next, etc. throughout the width of the airfoil. The edges of the leading edge section 33 overlap sections 21 and 27 and sections 26 and 32 overlap the trailing edge section 34. The bent back edge portions of adjacent sections interlock as shown in Figs. 7, 9 and 10. This construction provides simple rugged interlocked telescoping joints.

Each longitudinally extending skin section except the leading edge section 33 and the trailing edge section 34 is provided with a more or less H-shaped metal section 35 which is riveted or otherwise suitably secured to its inner surface adjacent but spaced slightly from its rear longitudinal edge.

The upper edges of hinged sections 4 and the lower edges of hinged sections 5 are rounded as shown at 36 and each such rib section in line with the H-sections 35 is provided with an undercut slot 37 to receive the web and free flange of such H-section. The upper edge of each hinged section 4 and the lower edge of each hinged section 5 while in the main conforming to the contour of the cambers is in reality preferably stepped as shown in Figs. 8 and 10 to accommodate the telescoping joints before referred to.

The finger-like edge portions 38 and 39 which overlie slot 37 are rounded in transverse section as shown in Fig. 10 to form bearing pins which are adapted to lie between the upper and lower flanges of the H-sections 35. This construction permits sliding movement between the H-sections 35 and the finger-like edge portions 38 and 39 during tilting movement of the hinged rib sections. These finger-like portions or projections in cooperation with the H-sections and the interlocking telescoping joints securely hold the skin sections in adjusted position.

The section ordinates of the airfoil are proportionally increased as hinged rib sections 4 and 5 are tilted toward vertical position and are proportionally decreased as said sections are tilted away from the vertical position. For this reason, the profile of the airfoil for all adjustments of its cambers remains in the same family or class. That is, if the profile at maximum camber is a Clark Y, it will be a Clark Y at minimum camber and at all adjustments between maximum and minimum cambers.

The airfoil profile or section is perfectly symmetrical regardless of the airfoil setting, and changes in the airfoil setting do not shift the center of gravity of the aircraft. Perfect aerodynamic balance is maintained at all settings and while shifting from one setting to another, the aircraft at all times maintains a perfect longitudinal trim, thereby insuring greater visibility, better control sensitivity and less chance for misjudgment.

*The airfoil of the second form*

In the airfoil of the second form, the ribs which are numbered 40 are hinged to or pivotally mounted on the spars 2 and 3 which pass therethrough as shown in Figs. 13 and 14. This construction permits the ribs to be tilted longitudinally of the airfoil about their hinge or pivot points formed by support shafts or hinge pins 41 and 42. The shafts or pins shown in Fig. 14 (Fig. 14 being an enlarged detail view looking toward the back of Fig. 13 in the vicinity of spar 2) are carried in bracket members 43—43 secured to ribs 40 and are journaled in bearing sleeves 44 carried by the spars.

The ribs as in the first form are arranged in side-by-side spaced relation throughout the length of the airfoil as shown in Fig. 15.

An operating shaft 45 preferably tubular in section extends through openings in each of the ribs and is pivotally connected as shown at 46 to each rib so that as the same is reciprocated the ribs will be simultaneously tilted toward or from vertical position.

The airfoil skin is the same as in the first form and the connections between the longitudinally extending sections of the skin and the ribs are the same as in the first form.

*Third form of airfoil*

In the third form of airfoil of this invention, each of the ribs comprises a fixed lower section 47 which is carried by and secured to spars 2 and 3 and an upper section 48 located above its section 47. The upper section is carried by support arms 49 and these arms at the chord line are hingedly connected to the fixed section 47. This is best illustrated in Fig. 17 which figure is an enlarged detail view looking toward the rear of Fig. 16 in the vicinity of spar 2.

In order to accommodate support arms 49, fixed rib section 47 is slotted as shown at 50 with the upper end of each slot bridged by a stiffening plate 51 which corresponds to stiffening plates 13 and 14 in the first form. The upper end of each support arm 49 is offset as shown at 52 so that when hinged section 48 of each rib is in vertical position, it will lie flush with its fixed rib section 47.

Each support arm 49 at its lower end is enlarged as at 53 to receive a hinge or pivot pin (not shown) which is journaled in suitable bearing brackets 54 secured to opposite sides of fixed section 47 in such manner that the axes of the hinge or pivot pins lie midway between the opposite side faces of section 47.

Each hinged rib section 48 is notched as at 55 and 56 so as to clear the top of spars 2 and 3 when the hinged sections are given their maximum tilt.

A control shaft 57 which extends longitudinally of the airfoil and passes through openings in each of the ribs is connected to each rib by a lever arm 58 so that as the actuating rod is reciprocated, all rib sections 48 will be tilted toward or from vertical position.

The skin 59 forming the lower camber in the third form of airfoil is secured to the fixed rib section 47 and is therefore fixed as is usual. The upper skin forming the upper camber is made up of longitudinally extending sections as in the first and second forms. These sections are numbered 60, 61, 62, 63, 64 and 65 and telescoping joints of the type before referred to are employed between these sections. A telescoping joint is also employed between forward edge 66 of the fixed skin and section 60 of the upper skin. A telescoping joint is also employed between the rear edge 67 of the fixed skin 59 and the rear edge of upper skin section 65. The forward edge of lower skin 59 extends upwardly over the leading edge of the airfoil and terminates in one half of such telescoping joint and the rear edge of lower skin 59 extends upwardly and over the trailing edge of the airfoil and terminates in one half of such telescoping joint.

In Figure 19, I have shown a stabilizer embodying the third form of airfoil of this invention. The fixed rib sections 68 of the stabilizer are carried by and secured to spars 69 and 70. The hinged section 71 of each rib is supported by support arms 72 which are hinged to the fixed rib section at the chord line and the hinged rib sections are operated by a control shaft 73 to which each tilting rib section is attached.

An elevator 74 of the usual type is secured to the rear edge of the stabilizer and will be under the control of the pilot in the usual manner.

It will be obvious that instead of utilizing the airfoil of the third form in connection with the stabilizer, an airfoil constructed in accordance with either the first or second forms may be employed, if desired.

*Ailerons*

In the conventional wing design, the aileron is generally a portion of the trailing edge of the wing. With the wing embodying this invention, it is impractical to include the aileron as a portion of the wing and in Figs. 20-23 inclusive, I have illustrated an external type of aileron which may be utilized in connection with wings embodying this invention. This type of aileron as disclosed is located on the underside of the trailing edge of the wing and is an improvement over the conventional design in that the controls are effective at all angles of attack including the stalling angles.

In aircraft of the type in which the space within the wings is utilized, the tiltable wing sections of this invention (first form) can be mounted above the roof and below the floor of the wing space or compartment and above the roof in the third form and such sections can be simultaneously tilted by means of suitable gear and lever mechanisms.

Having thus described my invention, what I claim as new and desire to secure by Letters Patent is:

1. In an airfoil, a skin forming the upper camber and comprising a series of longitudinally extending sections connected by sliding joints for permitting relative movement therebetween chordwise of the airfoil, a series of spaced skin support members extending chordwise of the airfoil and each mounted for tilting movement about its chord line, means connecting certain of said skin sections to said skin support members whereby relative chordwise movement between said skin sections occurs as said skin support members are tilted, and means for simultaneously tilting said skin support members.

2. In an airfoil, longitudinally extending spars, a series of spaced rib members carried by said spars, extending chordwise of the airfoil and each of which is mounted for tilting movement about its chord line, a skin forming the upper camber and comprising longitudinally extending fixed position end sections and a series of longitudinally extending sections intermediate said end sections and which are movable chordwise of the airfoil, means connecting said movable skin sections to said rib members whereby such sections are held in adjusted position, and means for simultaneously tilting said rib members and changing the relative position of said skin sections to thus vary the upper camber and the airfoil thickness.

3. In an airfoil, longitudinally extending spars, a series of spaced rib members connected to said spars, extending chordwise of the airfoil and mounted for tilting movement longitudinally of the airfoil, skin support members hinged to said rib members and tiltable about the chord line thereof, a skin forming the upper and lower cambers and comprising a series of sections extending longitudinally of the airfoil and with the sections intermediate the end sections movable chordwise of the airfoil, means for securing the intermediate skin sections to said skin support members and means for tilting said skin support members and moving said skin sections chordwise thus varying the upper and lower cambers and the airfoil thickness.

4. In an airfoil, a series of skin support members spaced longitudinally of the airfoil, extending chordwise thereof and each being mounted for tilting about a chord line, a skin forming the upper camber and comprising a series of longitudinally extending sections with sliding joints therebetween; the sections at the leading and trailing edges being fixed and those intermediate the same being movable chordwise of the airfoil, means for securing the intermediate skin sections to each of said skin support members and means for simultaneously tilting said skin support members and changing the relative position of said skin sections thus varying the upper camber and the airfoil thickness.

5. In an airfoil, spaced spars extending longitudinally of the airfoil, a series of spaced ribs carried by said spars, extending chordwise of the airfoil and having upper and lower sections tiltable in opposite directions about the rib chord line, an airfoil skin forming the cambers and comprising a series of longitudinally extending overlapping sections having sliding joints therebetween to permit relative movement therebetween chordwise of the airfoil, means for securing certain of said skin sections to the tiltable sections of said ribs, and means for simultaneously tilting said rib sections and changing the relative position of said skin sections thus varying the upper and lower cambers and the airfoil thickness.

6. In an airfoil, longitudinally extending spars, a series of spaced ribs carried by said spars and each having an upper and a lower section hinged thereto and simultaneously tiltable in opposite directions about the chord line, a skin comprising longitudinally extending overlapping sections having sliding joints therebetween for permitting relative movement thereof chordwise of the airfoil, means for anchoring certain of said skin sections to said hinged rib sections and means for simultaneously tilting said hinged rib sections.

7. In an airfoil, spaced longitudinally extending spars, a series of spaced ribs extending chordwise of the airfoil, a skin support member mounted on each of said ribs for tilting movement about the rib chord line, a skin comprising longitudinally extending overlapping sections having sliding joints therebetween, means for securing certain of said skin sections to said support members and means for simultaneously tilting said support members and varying the upper camber and the airfoil thickness.

8. In an airfoil, spaced longitudinally extending spars, a series of spaced parallel skin support members supported from said spars, each extending from the leading to the trailing edge of the airfoil and being tiltable about a chord line, a skin for the upper camber made up of longitudinally extending and overlapping metal sections having sliding joints therebetween, means for connecting certain of said skin sections to the skin support members and means for simultaneously tilting the skin support members and varying the upper camber and the airfoil thickness.

9. In an airfoil for aircraft, longitudinally extending spars, a series of spaced parallel ribs carried by said spars and each having an upper section which is mounted for tilting about the chord line, an upper skin comprising longitudinally extending fixed end sections and movable sections intermediate said end sections with sliding joints between said sections for allowing relative movement thereof chordwise of the airfoil, means connecting said movable skin sections to the upper sections of said ribs and means for simultaneously tilting said upper rib sections and varying the upper camber and the thickness of the airfoil.

10. In an aircraft wing airfoil, spaced longitudinally extending spars, a series of spaced ribs carried by said spars, extending chordwise of the airfoil and each comprising a fixed lower section and an upper section hinged to the lower section and tiltable about the chord line, an upper skin formed of longitudinally extending sections having sliding joints therebetween to permit relative movement between said sections chordwise of the airfoil, means connecting all but the end skin sections to the upper rib sections and means for simultaneously tilting all of the upper rib sections and varying the upper camber and airfoil thickness.

11. In a wing airfoil for aircraft, a skin comprising overlapping telescopically arranged longitudinally extending sections, rib members extending chordwise of the airfoil and mounted for tilting about a chord line, means securing certain of said skin sections to said rib members and means for simultaneously tilting said rib members longitudinally of the airfoil and varying the upper and lower cambers and the airfoil thickness.

12. In a wing airfoil, longitudinally extending spars, a series of skin support members carried by said spars, extending chordwise of the airfoil, spaced at intervals throughout its length and each being mounted for tilting about a chord line; a skin defining the airfoil cambers and comprising a series of longitudinally extending overlapping sections provided with sliding joints therebetween to permit chordwise movement thereof except at the leading and trailing edges of the airfoil, means connecting the movable skin sections to said support members and means operatively connected to all of said support members for simultaneously tilting the same and moving the movable skin sections chordwise of the airfoil to vary the cambers and the airfoil thickness.

13. In a wing airfoil, longitudinally extending spars, a series of spaced skin support members carried by said spars, extending chordwise of the airfoil, and each being tiltable about a chord line; upper and lower metal skins defining the upper and lower cambers and comprising longitudinally extending fixed sections at the leading and trailing edges of the airfoil and intermediate sections which are movable chordwise, sliding joints between all of said sections whereby relative chordwise movement between said sections is permitted, means connecting said intermediate skin sections to said support members and means operatively connected to all of said support members for simultaneously tilting the same and moving said intermediate skin sections chordwise of the airfoil to vary the cambers and the airfoil thickness.

14. In a wing airfoil, a series of skin support members spaced at intervals throughout the length of the airfoil and each being tiltable about a chord line, a skin defining the cambers and comprising fixed longitudinally extending end sections and longitudinally extending sections intermediate said end sections and which are movable chordwise of the airfoil, sliding joints between all of said sections for permitting relative movement theretbeween chordwise of the airfoil, means connecting said intermediate sections to said skin support members, and means operatively connected to all of said skin support members for simultaneously tilting the same and moving said intermediate skin sections chordwise of the airfoil to vary the cambers and the airfoil thickness.

15. In a wing airfoil, longitudinally extending spars, a series of skin support members carried by said spars, extending chordwise of the airfoil, spaced at intervals throughout its length and each being tiltable about a chord line; a skin defining the upper and lower cambers and comprising longitudinally extending fixed position end sections and a series of longitudinally extending movable sections intermediate said end sections; sliding joints between all of said sections for permitting movement of said intermediate sections chordwise of the airfoil, means connecting said intermediate skin sections to said skin support members and means operatively connected to all of said skin support members for simultaneously tilting the same and moving the intermediate skin sections to vary the cambers and the airfoil thickness.

16. In a wing airfoil, a series of upper and lower skin support members extending chordwise of the airfoil and which determine the airfoil profile; said skin support members being spaced at intervals throughout the length of the airfoil and each being tiltable about an axis which extends chordwise of the airfoil, a skin defining the upper and lower cambers and comprising fixed position end sections and a series of intermediate longitudinally extending movable sections; sliding joints between said skin sections for permitting relative chordwise movement of said intermediate sections; means connecting said intermediate skin sections to said skin support members and means operatively connected to all of said skin support members for simultaneously tilting the same and moving said intermediate skin sections to vary the cambers and the airfoil thickness.

17. In a wing airfoil, a series of skin support members having upper and lower surfaces extending from the leading to the trailing edge of the airfoil and defining the airfoil profile; a skin comprising longitudinally extending end sections having their position fixed, and a series of longitudinally extending movable sections intermediate said end sections, means for interlocking said sections and forming sliding joints to permit relative chordwise movement theretbeween, means for securing said intermediate skin sections to said skin support members, means for mounting said skin support members for tilting movement longitudinally of the airfoil, and means for simultaneously tilting said skin support members and moving the intermediate skin sections to vary the cambers and the thickness of the airfoil.

WILLIAM H. RILEY.